(12) United States Patent
Abrash et al.

(10) Patent No.: US 8,226,416 B2
(45) Date of Patent: Jul. 24, 2012

(54) METHOD AND APPARATUS FOR READING EDUCATION

(75) Inventors: Victor Abrash, Montara, CA (US); Douglas Bercow, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 1262 days.

(21) Appl. No.: 11/952,713

(22) Filed: Dec. 7, 2007

(65) Prior Publication Data

US 2008/0140401 A1      Jun. 12, 2008

Related U.S. Application Data

(60) Provisional application No. 60/869,289, filed on Dec. 8, 2006, provisional application No. 60/972,606, filed on Sep. 14, 2007.

(51) Int. Cl.
| | |
|---|---|
| *G10L 11/00* | (2006.01) |
| *G10L 21/00* | (2006.01) |
| *G09B 19/04* | (2006.01) |
| *G09B 17/00* | (2006.01) |
| *G09B 19/00* | (2006.01) |
| *G09B 19/08* | (2006.01) |
| *G09B 19/06* | (2006.01) |

(52) U.S. Cl. ............... 434/185; 704/270; 704/270.1; 704/275; 434/156; 434/157; 434/178

(58) Field of Classification Search .......... 704/270–275; 434/156–157, 178, 185
See application file for complete search history.

(56) References Cited

U.S. PATENT DOCUMENTS

| | | | | |
|---|---|---|---|---|
| 4,713,777 | A * | 12/1987 | Klovstad et al. | 704/233 |
| 5,842,165 | A * | 11/1998 | Raman et al. | 704/255 |
| 5,895,448 | A * | 4/1999 | Vysotsky et al. | 704/270.1 |
| 5,920,838 | A * | 7/1999 | Mostow et al. | 704/255 |
| 6,269,336 | B1 * | 7/2001 | Ladd et al. | 704/270 |
| 6,937,975 | B1 | 8/2005 | Elworthy | |
| 6,988,063 | B2 * | 1/2006 | Tokuda et al. | 704/9 |
| 7,013,262 | B2 * | 3/2006 | Tokuda et al. | 704/9 |
| 7,877,255 | B2 * | 1/2011 | Zlokarnik | 704/252 |
| 2003/0028378 | A1 * | 2/2003 | August et al. | 704/260 |
| 2004/0006461 | A1 | 1/2004 | Gupta et al. | |
| 2005/0027527 | A1 * | 2/2005 | Junkawitsch et al. | 704/243 |
| 2005/0286743 | A1 * | 12/2005 | Kurzweil et al. | 382/114 |
| 2006/0111902 | A1 | 5/2006 | Julia et al. | |

OTHER PUBLICATIONS

International Search Report and Written Opinion for PCT/US07/86857, May 8, 2008, 8 unnumbered pages.

* cited by examiner

*Primary Examiner* — Eric Yen

(57) ABSTRACT

The present invention is a method and apparatus for reading education. In one embodiment, a method for recognizing an utterance spoken by a reader, includes receiving text to be read by the reader, generating a grammar for speech recognition, in accordance with the text, receiving the utterance, interpreting the utterance in accordance with the grammar, and outputting feedback indicative of reader performance.

33 Claims, 12 Drawing Sheets

METHOD AND APPARATUS FOR READING EDUCATION

CROSS REFERENCE TO RELATED APPLICATIONS

This application claims the benefit of U.S. Provisional Patent Applications No. 60/869,289, filed Dec. 8, 2006; and No. 60/972,606, filed Sep. 14, 2007, both of which are herein incorporated by reference in their entireties.

FIELD OF THE INVENTION

The present invention generally relates to the field of education and more particularly relates to the use of speech recognition systems for teaching reading skills and assessing reading fluency.

BACKGROUND OF THE DISCLOSURE

Learning to read is a critical part of the educational process and an essential prerequisite for most aspects of modern life. A key part of the learning process is repeated practice with feedback, leading to increased confidence and skill. Unfortunately, children (and adult literacy students) do not have the opportunity to read aloud often enough and receive such feedback.

Speech recognition systems known in the art are designed to recognize user utterances in an audio signal and translate them into a textual representation. A grammar is used to determine the likelihood of particular word sequences, essentially allowing the recognizer to dismiss unlikely sequences in favor of more likely ones, based on the knowledge of the structure of the task being recognized. However, grammars known in the art fail to appreciate the unique needs of individuals learning to read and do not perform well in recognizing these individuals' utterances.

Thus, there is a need in the art for a method and apparatus for using speech recognition systems to aid in reading practice, instruction, and assessment.

SUMMARY OF THE INVENTION

The present invention is a method and apparatus for reading education. In one embodiment, a method for recognizing an utterance spoken by a reader, includes receiving text to be read by the reader, generating a grammar for speech recognition, in accordance with the text, receiving the utterance, interpreting the utterance in accordance with the grammar, and outputting feedback indicative of reader performance.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to the use of speech recognition systems to assist those learning to read, or educators seeking to assess a student's reading proficiency on an absolute or relative basis. Although the examples given herein describe the reading of text in the English language, the invention is contemplated to include reading text written in any language.

Figure 1:
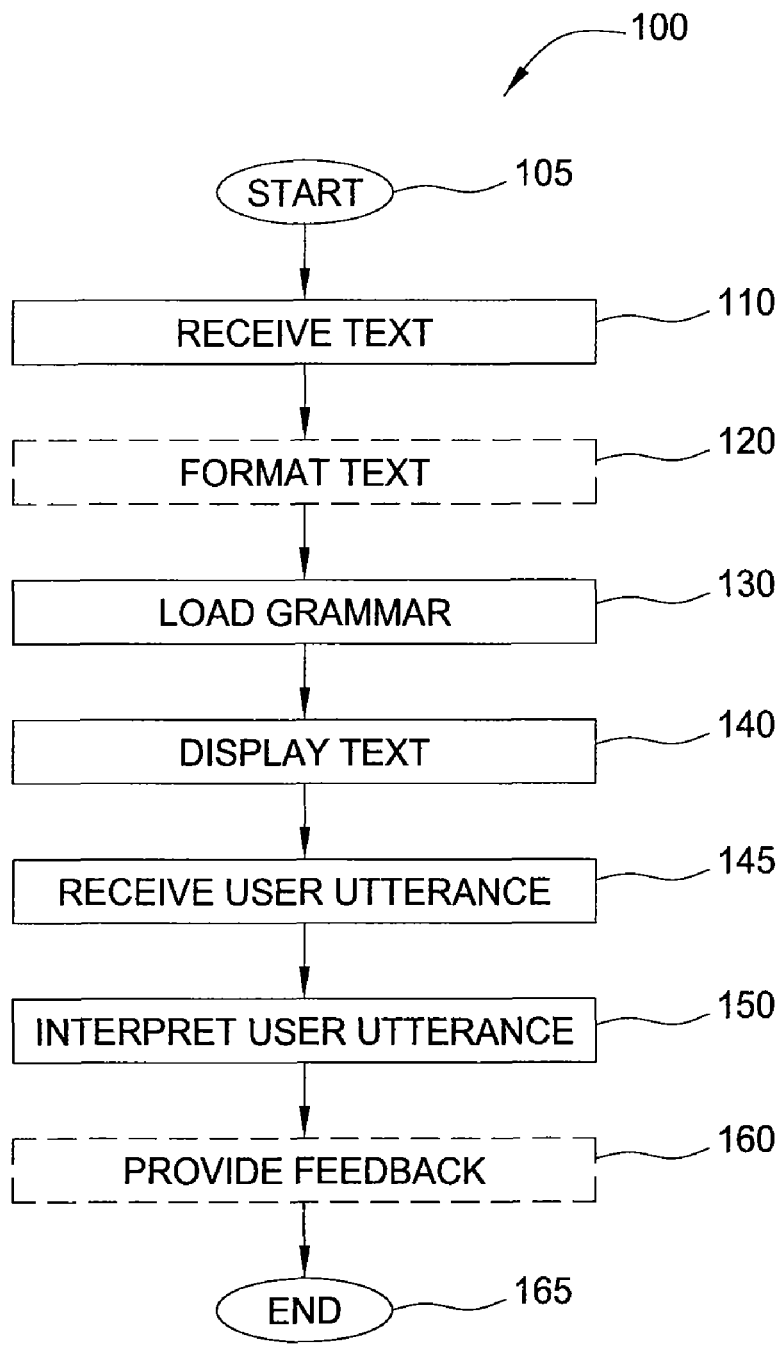
FIG. 1 is a flow diagram illustrating one embodiment of a method for recognizing speech of a reader.

FIG. 1 is a flow diagram illustrating one embodiment of a method 100 for recognizing the speech of a reader (i.e., a person learning to read). The method 100 may be implemented on a desktop computer, a laptop computer, a server computer, a landline telephone, a mobile telephone, a reading tablet, an electronic book, a personal digital assistant (PDA), a game console, a handheld game device, an electronic learning toy, a personal music/media player, an electronic pen, a scanning pen, a wireless headset, a dictation recording device, or the like. The method 100 may be implemented entirely on a single computing device, or partly or mostly on a remote computing device that is communicatively coupled to a separate user device. In some embodiments, method 100 may be implemented on multiple computing devices (e.g., a first device such as an electronic pen could be used to scan text and record audio, a second computing device could be used to perform speech recognition processing, and a third computing device could be used to display the results to a reader).

The method 100 is initiated at step 105 and proceeds to step 110, where text (comprising at least one word) to be read by the reader is received. In one embodiment, the text is received from a local storage device. In alternate embodiments, the text is received from a remote computer via a communications mechanism, such as the Internet. In one embodiment, the text comprises a preselected passage. In other words, an application developer, publisher, content owner, or service provider may pre-select the text to be read. In another embodiment, the reader selects the text himself or herself.

In one embodiment, the text comprises lines of words, each line being separated by a newline or carriage return character. In another embodiment, the text comprises sequences of words with formatting markup (e.g., hypertext markup language (HTML)) to describe where line breaks, page breaks, and the like will occur when the formatted text is displayed. In another embodiment, the text contains sequences of words with accompanying metadata or markup (e.g., extensible markup language (XML)), which in addition to text formatting information may contain semantic data such as word definitions or syllabification, pronunciation guides, translations into other languages, or other notes or context. In yet another embodiment, the text comprises hyperlinks or pointers. In one embodiment, the hyperlinks or pointers point to at least one of: a resource (e.g., audio or video recordings of the text being read by a person other than the reader); a page in a textbook (e.g., to which the specific text being read relates); an electronic dictionary or electronic thesaurus; or a phonemic-based representation of the words in the text (which can be submitted to other modules or engines, such as a text-to-speech engine or a lexical analysis engine).

In one embodiment, the text passage is received in digital text form (e.g., American Standard Code for Information Interchange, or ASCII). Application developers, publishers, content owners, or service providers may have the text readily available in digital text form. However, the reader (or even the aforementioned application developers, publishers, etc., in some instances) may not have a text passage readily available in digital text form, and he or she may need to convert the text, for example from a printed form on paper or from a display form in an image on a screen. In such a case, the text may be received by first performing optical character recognition (OCR), for example on a printed passage. An imaging device (e.g., a digital still or video camera, scanner, mobile phone, personal digital assistant (PDA), digital pen, multi-function printer, or intelligent photocopier device) can be used to capture an image of the printed passage suitable for OCR processing. This allows the reader to have greater influence over and selection of the source material that he or she uses to practice reading.

In optional step 120 (illustrated in phantom), the text is formatted. In one embodiment, formatting of the text includes positioning at least one text format feature (e.g., line breaks, page breaks, and the like). In one embodiment, the position of a text format feature is calculated at least partially in accordance with a characteristic (e.g., screen size) of a device on which the text is to be ultimately displayed. In embodiments not including step 120, formatting information contained in the received text may be used. In an alternative embodiment, the text is formatted in a way that is different from that suggested by any formatting information contained in the text (e.g., by submitting the text to a re-formatting engine). For example, the method 200 may provide the text to a separate engine (for example, an engine employing the LiveInk® technology, commercially available from Walker Reading Technologies, Inc. of Bloomington, Minn.) that applies a visual-syntactic formatting algorithm to assist struggling readers.

In step 130, a speech recognition grammar related to the text is loaded into a speech recognition system. In one embodiment, the grammar is compiled before the reader reads the text. In another embodiment, the grammar is compiled after the reader reads the text, and tracking and/or assessment, as described in further detail below, may be performed as an after-the-fact task.

In one embodiment, the grammar is constructed such that for any given word in the text, the reader can say the next word, skip the next word, repeat the current word, go back one word, or go back the beginning of the current phrase or sentence. For line-ending words, the reader can go to the next line, repeat the current line, or go the previous line; transitions to previous lines may be optionally prohibited if doing so would transition to a previous paragraph. In one embodiment, a time limit may be placed on recognition (e.g., on a per-word basis, a per-line basis, or a per-text basis). In other embodiments, additional word transitions may be allowable.

In one embodiment, the speech recognition grammar is received from a local storage device. In another embodiment of the invention, the grammar is automatically generated using the method 200 taught herein. In a further embodiment, the grammar is received from another computer via a communications medium, such as the Internet.

In step 140, the text is displayed to the reader. In one embodiment, the text is displayed according to formatting information (e.g., line breaks, page breaks and the like) contained in the received text. In another embodiment, the text is displayed according to formatting information generated in step 120.

In step 145, the method 100 receives a reader utterance in response to the displayed text. That is, the reader reads aloud at least a portion of the displayed text, and the method 100 receives this utterance (e.g., as a speech signal). In step 150, the reader utterance is interpreted by the speech recognition system, in accordance with the grammar loaded in step 130. That is, the method 100 performs speech recognition processing on the reader utterance.

As was described above with respect to step 130, grammar compilation may, but is not required to, occur prior to the time that the reader performs the reading activity (i.e., reading/utterance of the text). Similarly, speech recognition processing of the utterance against the grammar may, but is not required to, occur at the time that the reader performs the reading activity. One embodiment of the invention engages the speech recognition engine substantially simultaneously with the utterance of the text. However, in further embodiments, speech recognition occurs off line (e.g., after the reader has completed uttering the text).

In some embodiments of the invention, the display step 140, the receipt of the reader utterance in step 145, and the recognition step 150 are performed substantially simultaneously, enabling substantially real-time feedback to be provided to the reader during his or her reading of the text. In some embodiments, partial recognition results from step 150 may be used to display the text with a prompt for the reader, akin to a "bouncing ball" as typically used in the display of karaoke. The prompt may follow the reader, highlighting a word in the text corresponding to the last word that the reader uttered. Alternatively, the prompt may lead the reader, highlighting a word in the text after the last word that the reader uttered. In one embodiment, the prompt becomes active only when (or after) the reader is having difficulty. Further, if the reader is having difficulty (e.g., repeated restarts, prefix utterances, or long pauses) in reading a particular word, the system could sound out the particular word to assist the reader.

In optional step 160 (illustrated in phantom), the method 100 provides feedback to the reader regarding his or her reading performance. In one embodiment, the feedback comprises a grade or a score. In some embodiments, feedback may be provided in substantially real-time during recognition, for example by highlighting low-scoring or high-scoring words or highlighting missing words. In some embodiments, feedback may only be provided when the reader has finished reading, or both during and after reading.

In one embodiment, a score provided to the reader in connection with step 160 includes at least one of: the number of words read by the reader in a given period of time (e.g., one minute), the number of words read correctly in the given period of time, the time taken to complete reading the text (or portion(s) thereof), a sentence, a phrase, or a word likelihood or confidence score from the speech recognition system, and a ratio/percentage of words read correctly relative to a total number of words read.

In an alternative embodiment, a score provided to the reader in connection with step 160 is a dialog act score, related to a measure of pitch, including whether the correct intonation is used to adhere to cues in pace, rhythm, and timing (for example as indicated by punctuation) to delimit statements, questions, greetings, imperatives, commands, or the like. In one embodiment, computation of dialog act scores is performed using the methods described in "*Can Prosody Aid the Automatic Classification of Dialog Acts in Conversational Speech?*" by E. Shriberg et al., Language and Speech 41(3-4), pp. 439-487 (1998), which is herein incorporated by reference in its entirety. Intonation information may also be used to describe the "emotion" of the reader and to score how the reader appropriately reflects emotion in his or her delivery of the text.

In yet another embodiment, a score provided to the reader in connection with step 160 includes a duration score, related to the durations of phrases, words, phones, inter- or intra-phrase pauses, or inter- or intraword pauses, and how they correlate with one another or with human-defined measures of fluency or expressiveness. In one embodiment, a duration score for the reader is compared against duration scores for a reference recording of a reader of comparable reading level reading the text, or against duration scores for a group of readers each representing a different reading level.

In another embodiment still, a score provided to the reader in connection with step 160 includes a fluency score. In one embodiment, a fluency scores uses "reject" word recognition, as described in further detail below, to detect disfluencies, sounding out, or the presence of other reading strategies. In another embodiment, a fluency score explicitly recognizes disfluencies and a variety of reading strategies using specially targeted grammar rules or acoustic models.

In another embodiment, a score provided to the reader in connection with step 160 includes a score related to the path taken through the recognition grammar, including reject words, pauses, word repeats, phrase repeats, sentence repeats, line repeats, or other errors.

In another embodiment, a score provided to the reader in connection with step 160 includes a sentence pronunciation score, a phrase pronunciation score, a word pronunciation score, or a phone pronunciation score. In one embodiment, one or more of these pronunciation scores is calculated according to the methods described in U.S. Pat. No. 6,055,498 to Neumeyer et al., which is herein incorporated by reference in its entirety.

In one embodiment, the feedback provided in step 160 comprises identification of poorly read portions of the text. In another embodiment, the feedback comprises identification of correctly read portions of the text. In further embodiments, the feedback comprises identifying constructs that the reader skipped or repeated (e.g., words, lines, phrases, sentences, and paragraphs that the reader did not utter, or that the reader uttered more than once).

In one embodiment, the feedback provided in step 160 comprises identification of the amount of time for which the reader paused between uttering words in the text, and may further include identifying those words with a higher than average pause occurring before them, potentially indicating a problem word for the reader that he or she had to think hard about before uttering. In another embodiment, the feedback provided in step 160 presents a comparison of the reader's pause lengths to the pause lengths of a fluent reference reader and emphasizes the differences in order to teach correct expression. In another embodiment, the feedback comprises identification of whether the reader makes corrections of his or her own reading (e.g., not just from skips or repeats, but coming up with the right word after initially reading the word incorrectly or by substituting an entirely different word).

In one embodiment, the feedback provided in step 160 comprises identifying "extra speech", such as inserted words or sounds, sounding out or other reading strategies, and filled pauses, all of which may be detected by use of a recognizer reject model, by explicit inclusion in the speech recognition grammar, or by other means.

In one embodiment, the feedback provided in step 160 comprises a visual time-based trace of the reader's path through the text (e.g., a karaoke-like bouncing ball or a line passing through all of the recognized words, though the reader's path may not always be linear). In one embodiment, a fluency score is defined to be proportional to the linearity of such a path, or to a reference path.

In one embodiment, the feedback provided in step 160 is stored (and optionally transmitted to a remote device before storage), enabling review by the reader or by another person (e.g., a teacher). Stored feedback may be combined over multiple readings or plotted over time to indicate trends in the reader's reading ability. Stored feedback may further be compared to another reader's feedback, or aggregated with feedback of all readers in a classroom, or aggregated with readers in other classrooms at a school, district, state, or national level, to give a teacher an indication of overall class performance and to allow targeted help to individual readers or to identify class-wide problem areas. In some embodiments, the recognition result, time segmentation of the waveform representing the reader utterance into words or other units, and feedback is stored along with a recording of at least a portion of the reader's utterance such that the reader or the teacher can find and listen to specific portions of the recording. In some embodiments, the speed can be increased during playback in order to speed up the review process, or decreased during playback in order to listen to problem areas, in both cases without distortion or pitch changes. In one embodiment, stored feedback is further analyzed by applying a rubric (developed, for example, by the inventors or by a third party) and scoring the reader in a manner consistent with how a human trained on the scoring system would apply the rubric to determine a score or markup of the text read by a reader.

In some embodiments, the feedback provided in step 160 may be used to determine the choice of the next text for the reader to read. In accordance with the art of intelligent tutoring, the next text may be selected based on feedback indicative of problems with specific words or constructs requiring additional practice. The next text may also be selected based on feedback indicative of good performance, to increase the reader's confidence by presenting them with a text at their current skill level.

In one embodiment of the invention, the feedback provided in step 160 is visual feedback (e.g., delivered via a display device). Those skilled in the art will appreciate, however, that feedback may be provided to the reader via other media, including, but not limited to, audio feedback (e.g., wherein a speech generation application "reads" the feedback aloud to the reader) and printed feedback (e.g., wherein a written printout of the feedback is provided to the reader). Audio feedback may be desirable in instances where the device(s) on which the method 100 is running lacks a display screen (e.g., as in the case of a telephone or a digital pen). Printed feedback may be desirable in instances where the feedback needs to be communicated in document form (e.g., as in the case of a standardized test). In addition, any of the three feedback media mentioned (i.e., visual, audio, and printed) can be delivered in combination with each other. In one embodiment, visual feedback is presented as an overlay on the original screen viewed by the reader. The overlay mimics the way that a human (e.g., teacher) is trained to mark up a text passage when assessing a student reader.

In some embodiments, the recognition step 150 and the feedback step 160 are performed after the reader has finished reading the text. For example, a reader may read a passage into a headset or other device comprising a microphone and a memory into which the reader's utterance is stored. The stored utterance is subsequently read by a computing device which performs step 150 and (optionally) step 160. In further embodiments, either or both of step 150 and step 160 are performed using a second computing device separate from a first device used to display text to the reader, the first and second computing devices being communicatively coupled using a network such as a local area network, or a wide area network such as the Internet.

In some embodiments, the recognition step 150 and the feedback step 160 may be repeated one or more times after the reader has finished reading the text. This might be desirable, for example, if more computational resources are available for more detailed processing, to use newer or more accurate acoustic models, to take advantage of algorithmic or grammar improvements, to add new feedback methods, to use knowledge gained from the first recognition and feedback pass in order to provide more accurate recognition, scoring or feedback, etc. Additionally, the teacher may change the test, recognizer or grammar parameters, or the grammar itself and re-recognize and re-score the recording of the reader utterance in order to fix recognition or timing errors or re-evaluate the reading for other reasons.

In some embodiments, the recognition step 150 and the feedback step 160 are performed substantially at the same time, enabling substantially real-time feedback to the reader during his or her reading of the text. In embodiments utilizing real-time feedback, the feedback may further comprise providing 'hints' to the reader if it appears that he or she is having difficulty. In one embodiment, a hint is provided when the method recognizes that the reader has paused for a predetermined amount of time (e.g., a predetermined number of seconds or a multiple of the reader's average pre-word pause) after uttering the prior word. In another embodiment, a hint is provided when the method recognizes that the reader is experiencing difficulty reading a word (e.g., when the reader is "sounding out" a word). In some embodiments, the hint is provided by providing an audible reading of the next word (e.g., by playing pre-recorded audio or by automatically generating audio for the word using text-to-speech technology known in the art) or by other known or novel coaching methods. In further embodiments, the hint is provided visually by displaying the next word in an easier to decode manner (e.g., by marking the sequence of syllables with syllable dividers, giving the reader a granular approach to determining how to utter the next word). In another embodiment, the hint is provided by displaying an image corresponding to the word (e.g., a picture of an elephant for the word "elephant").

Following step 160, the method 100 is completed at step 165.

In one embodiment of the invention, the speech recognition step of the method 100 (i.e., step 150) is performed locally on a personal computer (PC) device incorporating a microphone into which the reader speaks. However, other instances of the invention allow for the speech recognition to occur on a different device than the device into which the reader speaks. For example, the speech recognition application could run on a separate device, such as a computer server, that receives audio of the reader uttering the text over a wide area communications network (e.g., a telephone connection or an Internet connection) or a local area communication network (e.g., a Bluetooth connection or an Institute of Electrical and Electronics Engineers 802.11 standard "Wi-Fi" connection).

Figure 2:
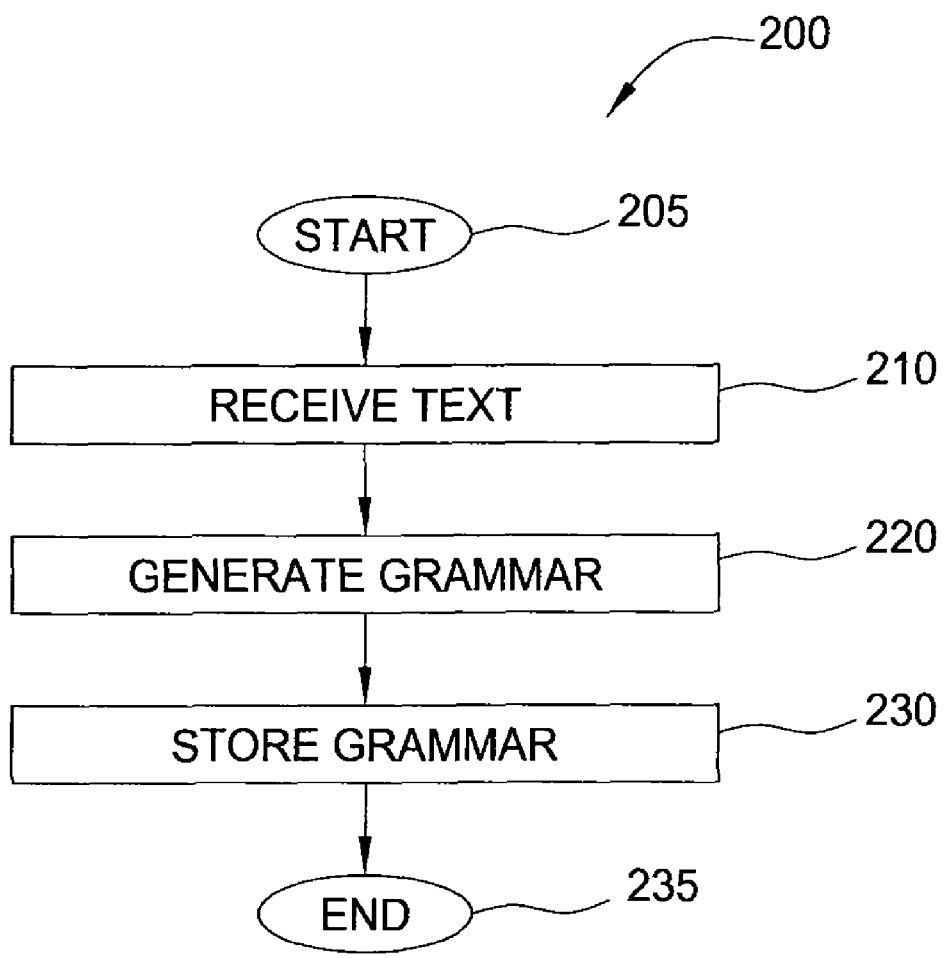
FIG. 2 is a flow diagram illustrating one embodiment of a method for generating a speech recognition grammar suitable for use in recognizing speech of a reader.

FIG. 2 is a flow diagram illustrating one embodiment of a method 200 for generating a speech recognition grammar from a text, suitable for a reader learning to read. The method 200 may be implemented, for example, in accordance with step 130 of the method 100.

The method 200 is initiated at step 205 and proceeds to step 210, where the text (comprising at least one word) from which the grammar is to be generated is received. In one embodiment, the text comprises a sequence of words along with markup indicating how the words will be split into lines and paragraphs when displayed to the reader. In another embodiment, the markup may include additional information to control the grammar generation process (e.g., grammar transition probabilities or other parameter values).

In step 220, the method 200 generates a speech recognition grammar from the text. The grammar is generated to include transitions representing at least one reading learner grammar feature.

In one embodiment, a reading learner grammar feature is recognition of mistakes in directionality. Within the context of the present invention, "directionality" is understood to refer to the way that print is tracked during reading (e.g., in most languages from left to right across the page and from top to bottom). Mistakes in directionality occur when a reader reads a first line of text and subsequently chooses the wrong line to read next (e.g., by re-reading the first line, by reading the prior line, or by skipping ahead to the line after next). In one embodiment, the grammar generated in step 220 is simplified by prohibiting transitions to a prior line if the prior line is in a previous paragraph; this simplification may reduce the recognition search complexity.

In one embodiment, a reading learner grammar feature is recognition of structural restarts. A structural restart occurs during the reading of a linguistic construct (e.g., a sentence, phrase, or word), when the reader starts reading the construct from the beginning rather than from where he or she left off. For example, in reading the sentence "One of the gentlest pets is the guinea pig," the reader may utter "One of the one of the gentlest pets is the guinea pig," indicating a structural restart following the first utterance of "the."

In some embodiments, structural restarts include restarting a word comprising a plurality of phonemes. For example, in reading the word "example," the reader may utter "ex exam example," indicating two structural restarts when constructing the utterance.

In one embodiment, a reading learner grammar feature is recognition of a jump-ahead. A positive jump-ahead occurs when words are skipped in the reading of a portion of text. Alternatively, a negative jump-head occurs when words are repeated. For example, a positive jump-ahead in reading the sentence "No place like home" may be uttered as "No like home," and a negative jump-ahead in reading the same sentence may be uttered as "No place like place like home." Repeating the most recently read word, as in "No place place like home", can be considered as either a zero jump-ahead or as a structural restart.

Figure 3:
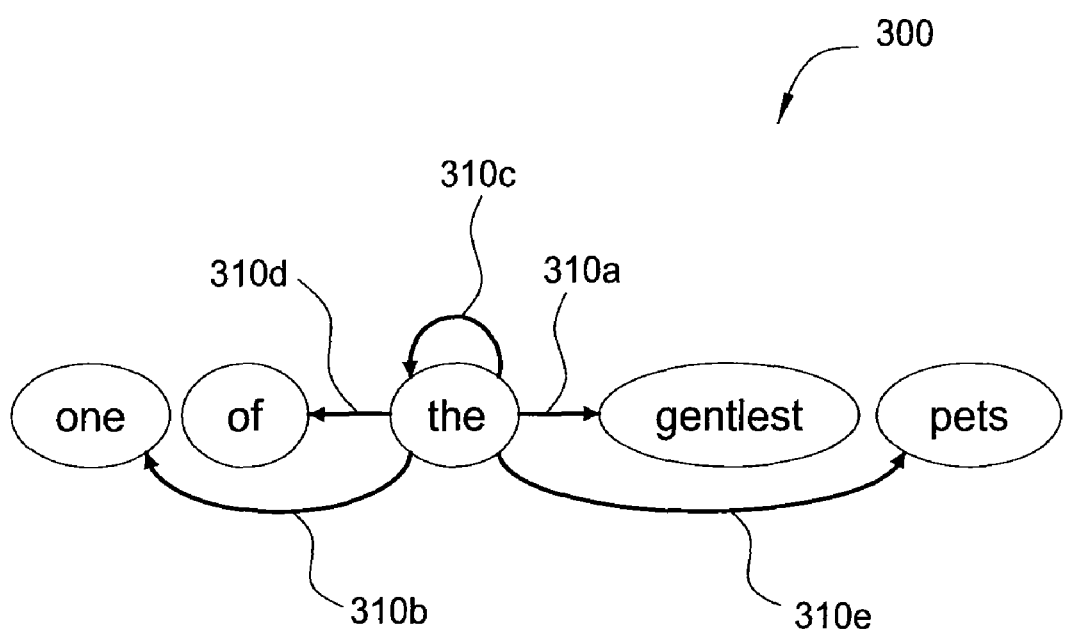
FIG. 3 depicts the allowable word transitions in a portion of an exemplary reading learner speech recognition grammar by type for a single word of an example sentence.

FIG. 3 depicts an example 300 of reading learner grammar features, such as those discussed above. Using the first five words of the example sentence "One of the gentlest pets is the guinea pig," and assuming a reader has already uttered "One of the . . . ," the example 300 shows the word transitions

310*a*-310*e* (hereinafter collectively referred to as "transitions 310") leaving the word "the" that are allowed by the grammar. The correct transition 310*a* is to the next word, "gentlest."

If the reader stops and begins re-reading the sentence from the word "one", as in "One of the one . . . ," a structural restart is indicated, represented by transition 310*b*. Another type of structural restart occurs if the reader repeats the most recent word, as in "One of the . . . ," represented by transition 310*c*.

If the reader utters, "One of the of . . . ," a negative jump-ahead is indicated, represented by transition 310*d*. Skipping the next word and uttering "One of the pets . . . " (i.e., omitting "gentlest") is an example of positive jump-ahead, represented by transition 310*e*. Similar word transitions occur from each word in the exemplary sentence, although of course there is no negative jump-ahead transition from the first word in the sentence (i.e., from "One"). Directionality transitions are not shown in this figure.

Figure 4:
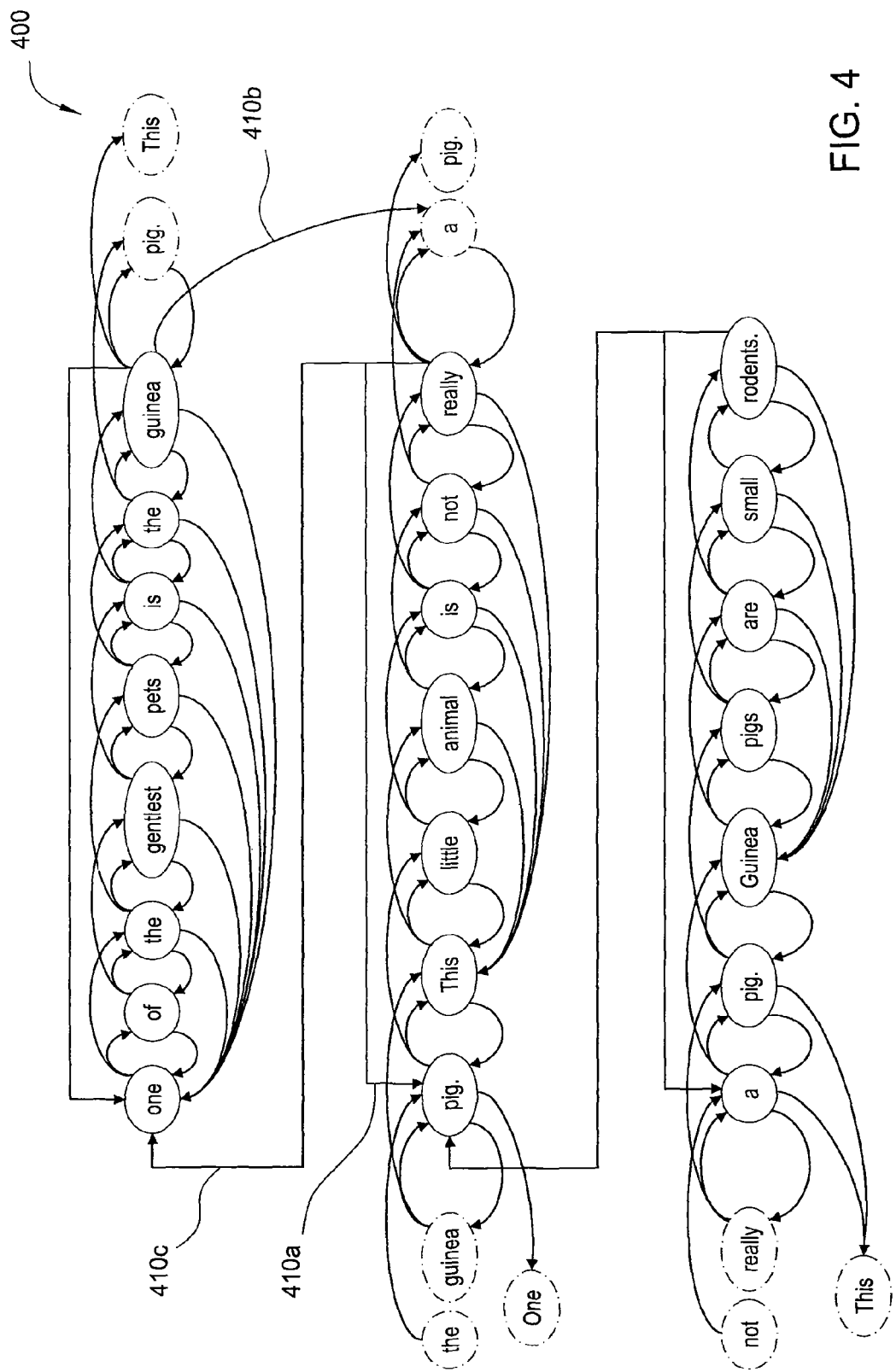
FIG. 4 depicts some of the allowable word transitions in an exemplary reading learner speech recognition grammar for an example text.

FIG. 4 depicts an example 400 of some of the allowable word transitions in the grammar for the formatted text:

One of the gentlest pets is the guinea pig. This little animal is not really a pig. Guinea pigs are small rodents.

Transitions representing structural restarts (repeating the same word, for example as represented by transition 310*c* in FIG. 3) are omitted from the example 400 for clarity. Nodes depicted in phantom at the right-hand edge of the figure are merely a drawing convenience to simplify the FIG. 4, and arcs to/from the right-hand phantom nodes are properly connected to the respective node in the next lower line. Similarly, phantom nodes on the left-hand edge represent the respective nodes in the next higher line of FIG. 4.

The example 400 therefore depicts the majority (subject to the drawing conveniences described above) of the allowable word transitions for the above formatted text according to one embodiment of the invention. In addition to the word transition types previously shown in FIG. 3, directionality mistakes shown here include repeating the current line (from "really" to "pig." in the first line, represented by transition 410*a*), skipping the next line (from "guinea" in the first line to "a" in the third line, represented by transition 410*b*), and going to a prior line (from "really" in the second line to "one" in the first line, represented by transition 410*c*).

Figure 5:
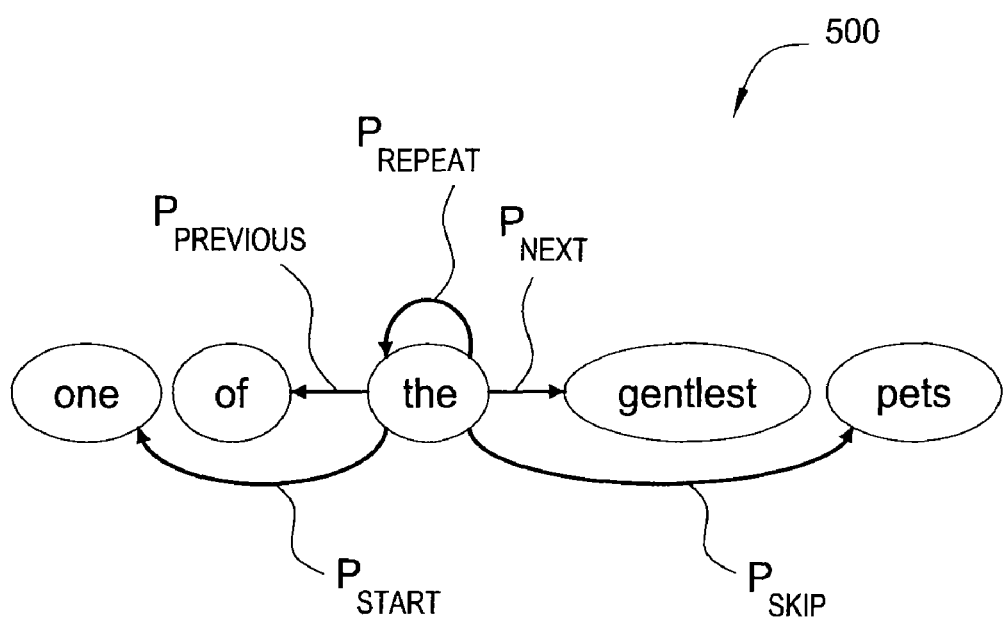
FIG. 5 depicts the allowable word transitions and their attached probabilities in a portion of an exemplary reading learner speech recognition grammar for a single word in an example sentence.

FIG. 5 depicts the allowable word transitions and their attached probabilities in a portion of an exemplary reading learner speech recognition grammar for a single word in an example sentence 500. In one embodiment, probabilities are attached to the word transitions as shown in the example 500. Here, the structural restart transitions are assigned the probabilities $P_{START}$ and $P_{REPEAT}$, the correct transition is given probability $P_{NEXT}$, and the jump-ahead transitions are assigned the probabilities $P_{PREVIOUS}$ and $P_{SKIP}$. For simplicity, directionality transition probabilities are not shown in FIG. 5.

Figure 6:
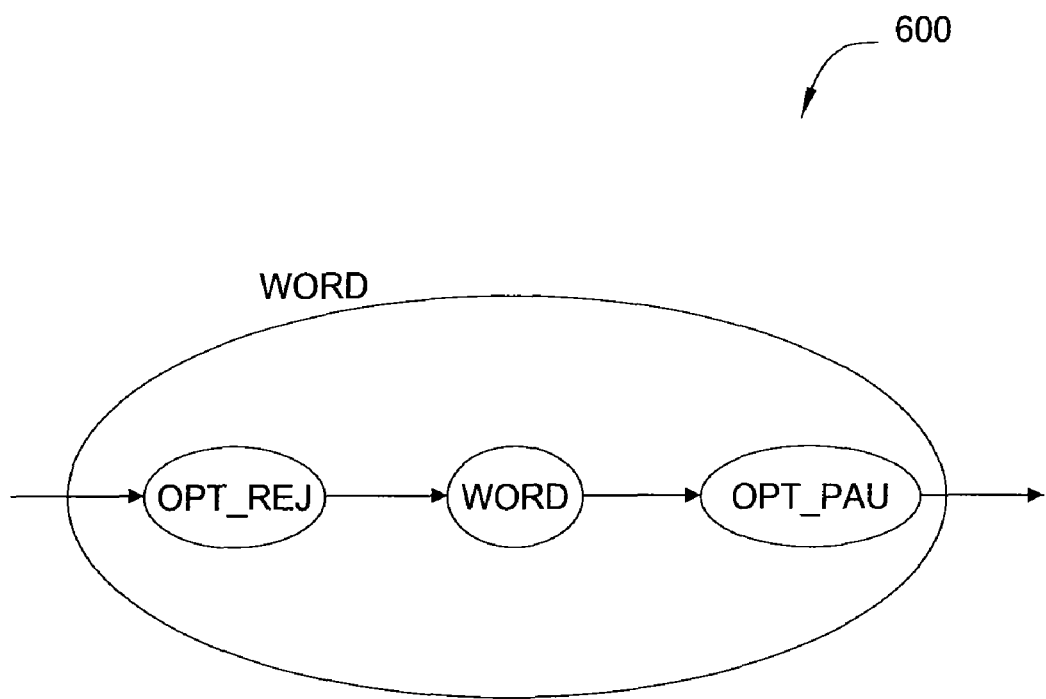
FIG. 6 depicts an exemplary word sub-grammar formed by replacing a word by the concatenation of an optional reject sub-grammar, the word, and an optional pause sub-grammar.

FIG. 6 depicts an exemplary word sub-grammar 600 formed by replacing a word with: (1) the concatenation of an optional reject sub-grammar; (2) the word; and (3) an optional pause sub-grammar. In one embodiment, each word in the grammar is replaced by a multi-word sub-grammar 600 consisting of an optional reject grammar "OPT_REJ," the word, and an optional pause grammar "OPT_PAU."

Figure 7:
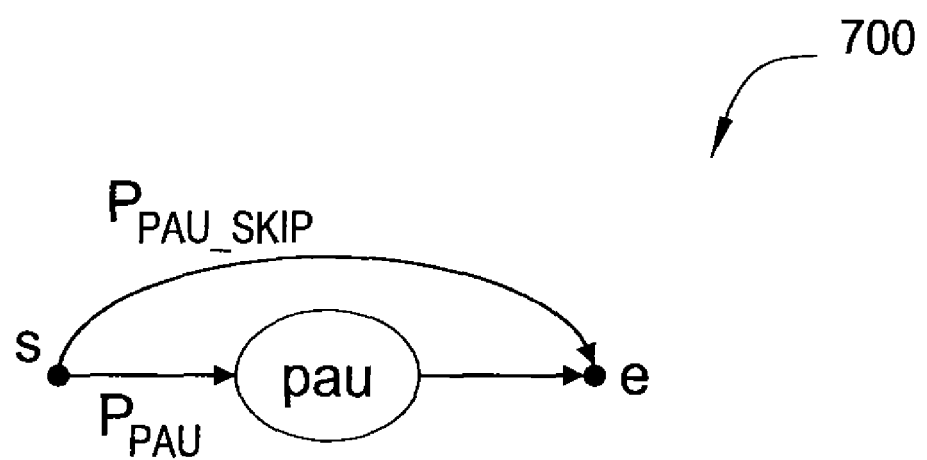
FIG. 7 depicts an exemplary optional pause sub-grammar.

The purpose of the pause grammar is to explicitly allow the grammar to recognize silences between words in an utterance. FIG. 7, for example, depicts an exemplary optional pause sub-grammar 700. In this example, the pause is optional because there is a path from the start grammar node "s" to the final grammar node "e" that does not pass through the silence word "pau." The relative likelihood of recognizing or not recognizing silence is adjusted by changing the grammar transition probabilities $P_{PAU\_SKIP}$ and $P_{PAU}$.

One purpose of the reject grammar is to explicitly allow the grammar to recognize partial-word structural restarts including restarting a word comprising a plurality of phonemes, as described above. Another purpose of the reject grammar is to explicitly allow the grammar to recognize filled pauses, such as "uh" or "um." Another purpose of the reject grammar is to recognize inserted out-of grammar words that are not in the passage being read. Another purpose of the reject grammar is to recognize very poor pronunciations of in-grammar words. In one embodiment, the reject grammar is configured to apply a penalty that alters the probability of recognition output, as discussed in greater detail below.

Figure 8:
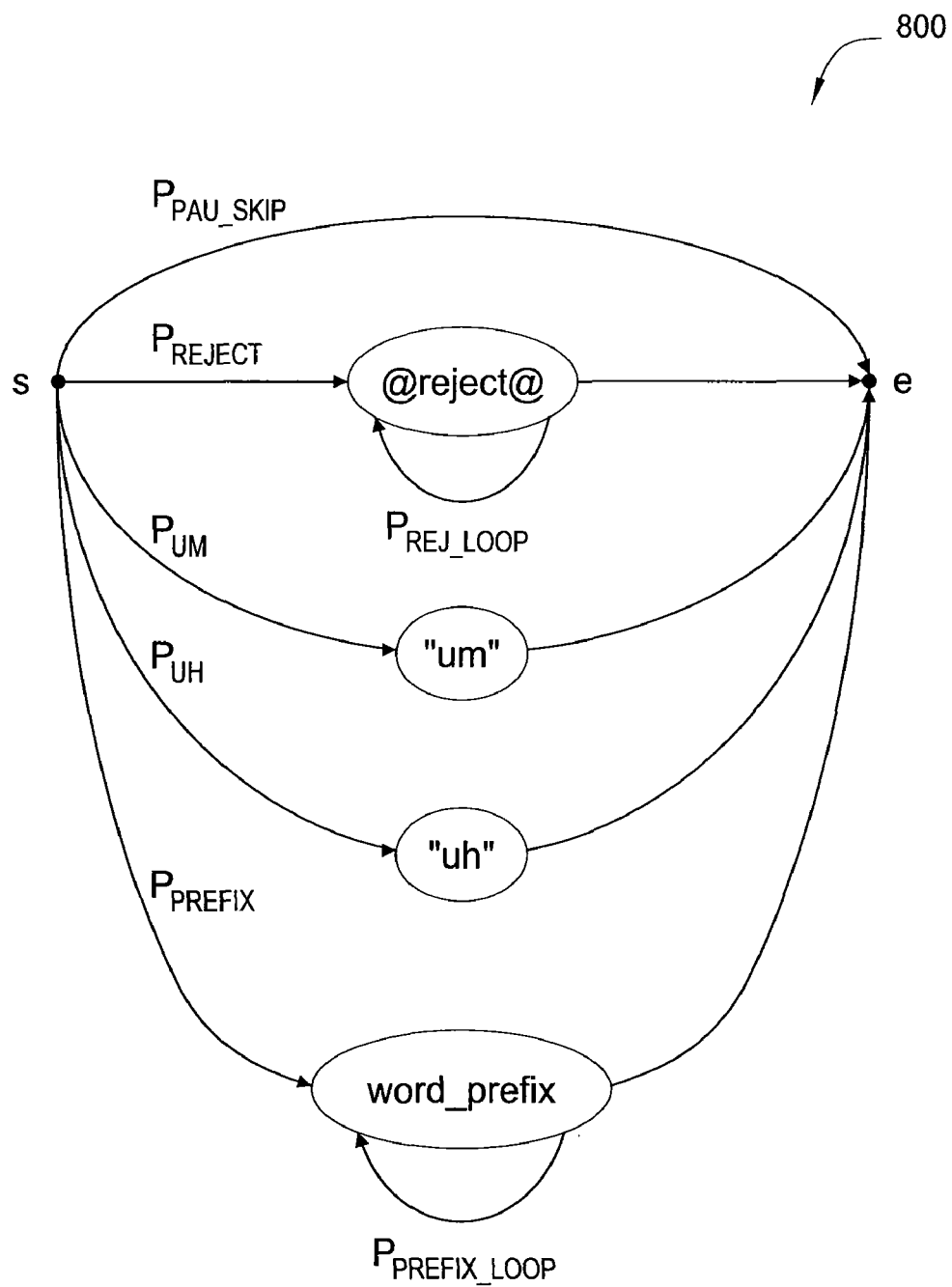
FIG. 8 depicts an exemplary optional reject sub-grammar.

FIG. 8 depicts an exemplary optional reject sub-grammar 800. In this example, the reject grammar 800 is optional because there is a direct path from the start grammar node "s" to the final grammar node "e." The relative likelihood of skipping this grammar is adjusted by changing the grammar transition probabilities (e.g., $P_{REJ\_SKIP}$).

In FIG. 8, the reject word "@reject@" is a word whose pronunciation is defined as a sequence of one or more reject phones that are trained to recognize all possible speech sounds. In another embodiment, the reject word is a word whose pronunciation is known in the art as a "context-independent phone loop," (i.e., a loop consisting of all the phones in parallel). For example, in reading the word "example" the reader might utter "ex . . . example," which would normally cause a recognition error. In this embodiment, the first "ex" sound could be recognized by the reject word allowing the following "example" to be recognized correctly.

Figure 9:
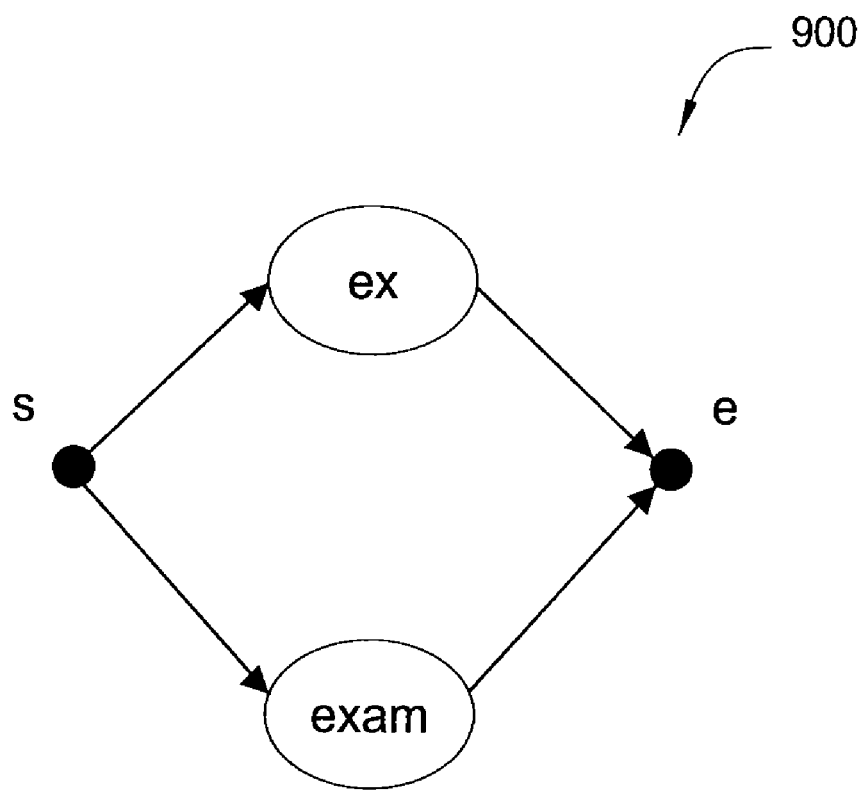
FIG. 9 depicts an exemplary "word_prefix" sub-grammar to recognize starting sub-pronunciations of the word "example"

In reject grammar 800 of FIG. 8, the word "word_prefix" is a word whose pronunciation is defined as one or more starting sub-pronunciations of the word "word." FIG. 9, for example, depicts an exemplary "word_prefix" sub-grammar 900 to recognize starting sub-pronunciations of the word "example." As illustrated in FIG. 9, the possible pronunciations of the word "example_prefix" could be "ex" and "exam," allowing these (and only these) structural restarts of the word "example" to be recognized explicitly; other structural restarts could still be recognized by the "@reject@" word of reject grammar 800.

In one embodiment, a multi-pass recognition strategy is used in order to locate and classify structural restarts. In one embodiment of this approach, the reject word could be used in a first recognition pass to detect the structural restart and localize it in time, followed by a second recognition pass using a dynamically constructed sub-grammar based on the previous and next words (and similar to the "word_prefix" grammar previously defined) on the localized speech segment in order to determine the exact structure of the structural restart. A multi-pass recognition strategy can be used to identify rejected words (e.g., by using a large vocabulary continuous speech recognition (LVCSR) system). For instance, the reader may utter the phrase "One of the gentlest pets" as "One of the generous pets." The word "generous" might be labeled as @reject@ on a first pass of the speech recognition engine. By using an LVCSR engine on a second pass, the word "generous" could be recognized, and feedback reflecting this recognition could be provided to the reader or to a teacher or other individual evaluating the reader.

In one embodiment, other common reading errors that are anticipated to occur in the learning process can be encoded in the grammar in order to allow these errors to be recognized and detected explicitly. In one embodiment, specific pronunciation mistakes are detected by replacing each word in the grammar with a further word sub-grammar consisting of the correct pronunciation of the word and one or more incorrect pronunciations of the word.

In another embodiment, the grammar transition probabilities described herein are adjusted to optimize learner reading speech recognition accuracy. Furthermore, there are additional parameters that work in conjunction with the grammar transition probabilities in order to optimize recognition accuracy and tracking of fluent or disfluent speech. These parameters alter the probability of the recognition output and can be used to balance one type of recognition error against other types of recognition errors. In one embodiment, a word transition weight serves to balance word insertion or deletion errors. In another embodiment, a grammar probability weight multiplies each grammar transition probability to increase or decrease the probability's contribution to the final recognition result relative to the acoustic likelihood score. In another embodiment, a reject weight globally increases or decreases the likelihood of recognizing any speech with the "reject" word.

Referring back to FIG. 2, once the grammar is generated, the method 100 stores the grammar at step 230. Storage may be short-term (e.g., in memory for immediate use) or long-term (e.g., on a disk drive). In some embodiments, the grammar may be generated in two steps, where the first step comprises generating all components of the grammar not dependent on text formatting, and the second step comprises augmenting the grammar generated in the first step with components dependent on text formatting. The results of the first step may be stored so that the second step can be performed later (e.g., when a set of text formatting information used on the reader's display device becomes known).

The method 200 is then completed at step 235.

Figure 10:
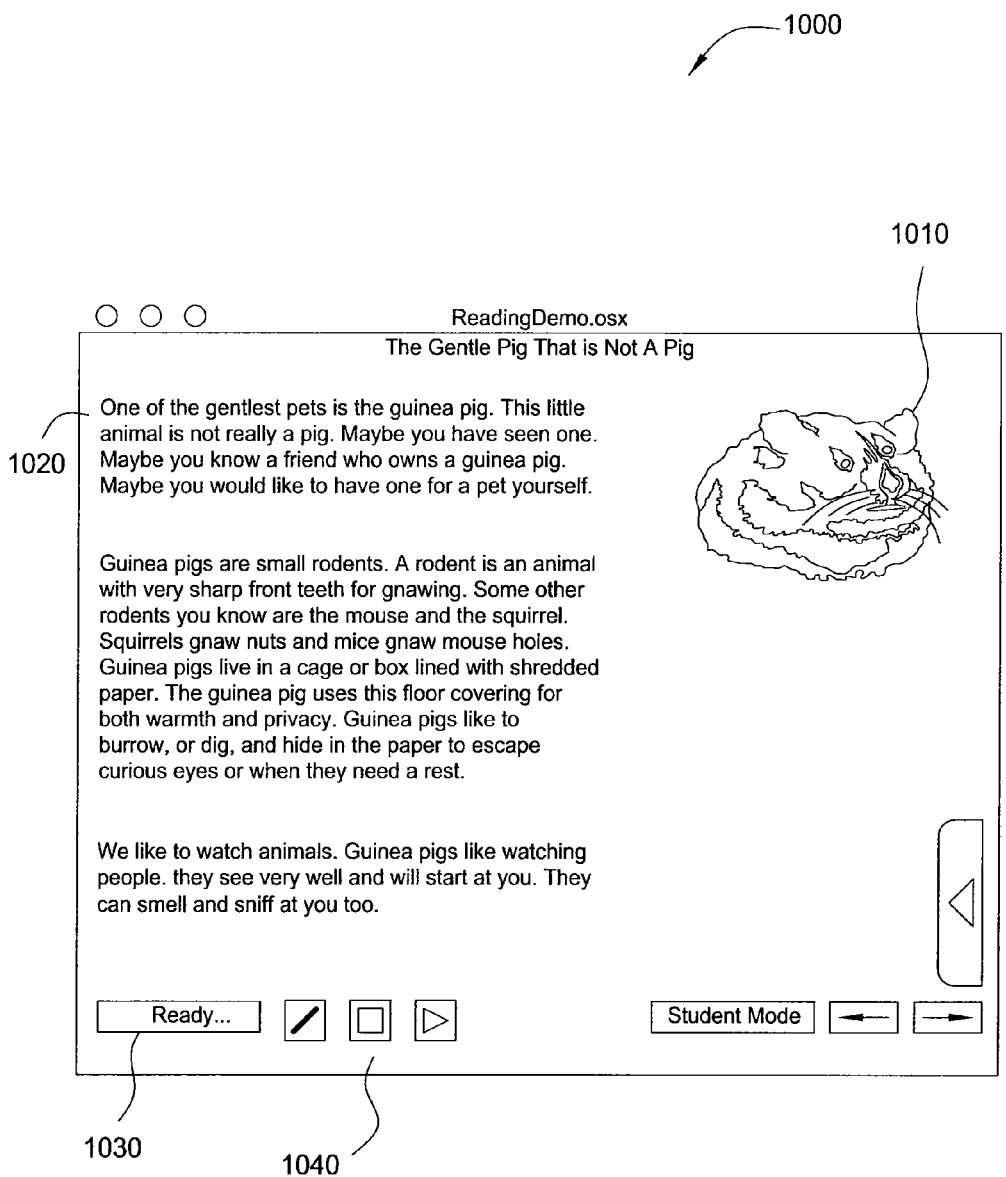
FIG. 10 depicts an exemplary display produced by an embodiment of the invention, before any speech recognition was performed.

FIG. 10 depicts an exemplary display 1000 produced by an embodiment of the invention, as generated before any speech recognition has been performed. The display 1000 comprises a picture 1010, and a text 1020 that has been processed in accordance with the method 200 to generate a grammar for a speech recognition system. The display 1000 further comprises a status display 1030, depicted as showing that the system is ready to begin recognition. The display 1000 also comprises controls 1040. In one embodiment, the controls include, but are not limited to, mechanisms for starting recognition, for playing back previously recorded speech, and for stopping recognition/playback.

Figure 11:
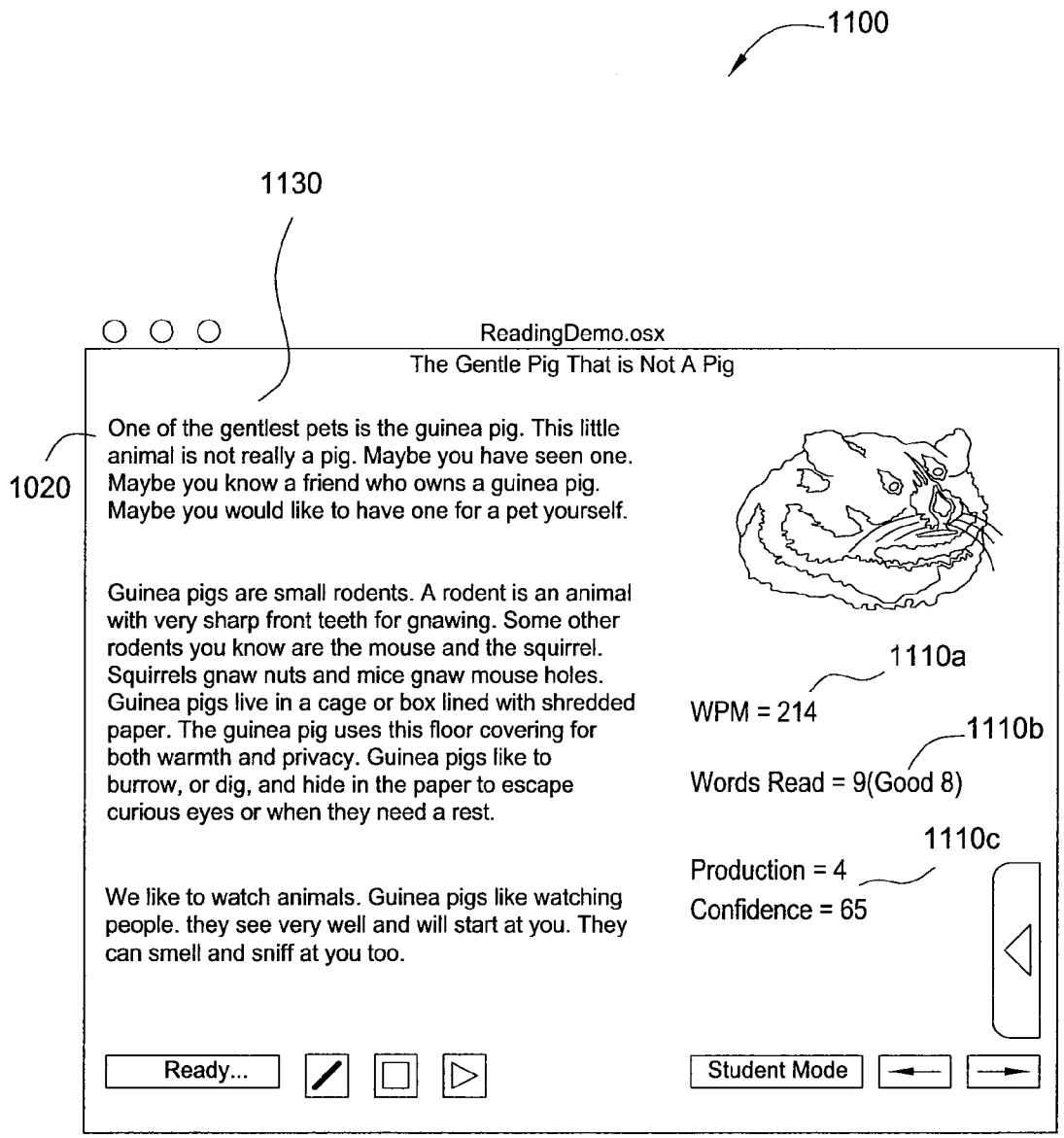
FIG. 11 depicts an exemplary display produced by an embodiment of the invention, after recognizing the first sentence, "One of the gentlest pets is the guinea pig"

FIG. 11 depicts an exemplary display 1100 produced by an embodiment of the invention, as generated after the first sentence of text 1020 (i.e., "One of the gentlest pets is the guinea pig.") has been recognized (e.g., according to step 150 of method 100). In one embodiment, the display 1100 visually differentiates the first sentence 1120 of text 1020 from a remainder of the text 1020 in order to represent the reader's progress through the text 1020. For example, the display 1100 may display the first sentence 1120 in a different color. In this example, the second word of the first sentence 1020 (i.e., "of") scored poorly, and is further visually differentiated (e.g., by display in a further color 1130). The display 1100 also comprises display of feedback indicia 1110a-1110c (e.g., generated according to step 160 of method 100). The displayed feedback indicia 1110a-1110c include the reader's speed in words per minute 1110a, the number of words read and the number of which were given high scores 1110b, and a score of the reader's pronunciation and confidence 1110c.

Figure 12:
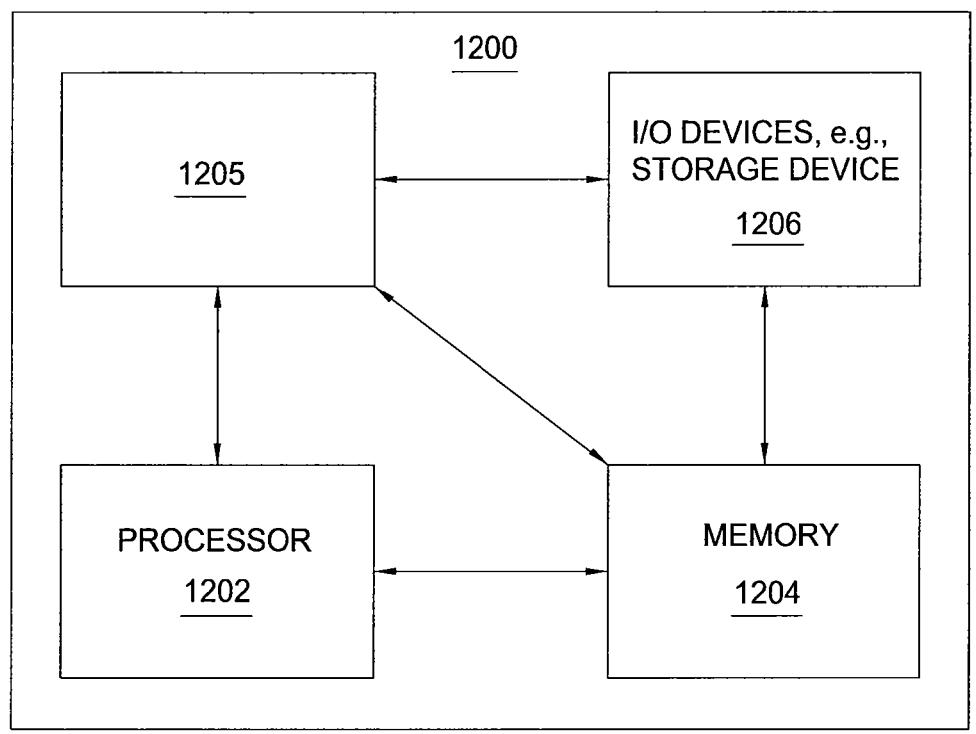
FIG. 12 is a high-level block diagram of the speech recognition method that is implemented using a general purpose computing device.

FIG. 12 is a high-level block diagram of the present invention implemented using a general purpose computing device 1200. It should be understood that the speech recognition engine, manager or application (e.g., for assisting readers— i.e., users learning to read) can be implemented as a physical device or subsystem that is coupled to a processor through a communication channel. Therefore, in one embodiment, a general purpose computing device 1200 comprises a processor 1202, a memory 1204, a speech recognition module 1205 and various input/output (I/O) devices 1206 such as a display, a keyboard, a mouse, a modem, a microphone, and the like. In one embodiment, at least one I/O device is a storage device (e.g., a disk drive, an optical disk drive, a floppy disk drive).

Alternatively, the speech recognition engine, manager or application (e.g., speech recognition module 1205) can be represented by one or more software applications (or even a combination of software and hardware, e.g., using Application Specific Integrated Circuits (ASIC)), where the software is loaded from a storage medium (e.g., I/O devices 1206) and operated by the processor 1202 in the memory 1204 of the general purpose computing device 1200. Thus, in one embodiment, the speech recognition module 1205 for recognizing speech of a reader learning to read described herein with reference to the preceding Figures can be stored on a computer readable medium or carrier (e.g., RAM, magnetic or optical drive or diskette, and the like).

Embodiments of the present invention may be deployed as a personal computer (PC)-based application, where the text read by the reader is already contained in the application and the specialized fluency grammar for speech recognition is compiled prior to the reader's use of the application. The speech recognition function may be performed locally on the PC being used by the reader, and the reader feedback displayed visually. However, this is only one of the contemplated embodiments of the invention, and those skilled in the art will appreciate that the present invention enables a variety of deployment scenarios.

Moreover, embodiments of the invention focus on the application of a speech recognizer to track and assess a reader's performance as he or she reads aloud, and so some form of mechanical audio recording is required. One embodiment of the invention employs a microphone built into a headset that plugs into a PC. However, those skilled in the art will appreciate that the audio may be recorded in a variety of ways, including (but not limited to) microphones built into: cellular telephones, landline telephones, headsets for voice over Internet Protocol (VOIP) telephones, digital pens, electronic books, wireless headsets, personal digital assistants (PDAs), personal computers, handheld game devices, electronic learning toys, and personal music or media players.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for recognizing an utterance spoken by a reader, the method comprising:
receiving text comprising one or more words to be read by the reader;
generating a grammar for speech recognition, in accordance with the text;
inserting at least one reading learner grammar feature into the grammar, wherein the at least one reading learner grammar feature comprises a recognition of at least one reading learner mistake;
receiving the utterance;
interpreting the utterance in accordance with the grammar; and
outputting feedback indicative of reader performance.

2. Apparatus for recognizing an utterance spoken by a reader, the apparatus comprising:
means for receiving text comprising one or more words to be read by the reader;
means for generating a grammar for speech recognition, in accordance with the text;
means for inserting at least one reading learner grammar feature into the grammar, wherein the at least one reading learner grammar feature comprises a recognition of at least one reading learner mistake;
means for receiving the utterance; and
means for interpreting the utterance in accordance with the grammar; and
means for outputting feedback indicative of reader performance.

3. A non-transitory computer readable medium containing an executable program for recognizing an utterance spoken by a reader, where the program performs the steps of:
receiving text comprising one or more words to be read by the reader;
generating a grammar for speech recognition, in accordance with the text;
inserting at least one reading learner grammar feature into the grammar, wherein the at least one reading learner grammar feature comprises a recognition of at least one reading learner mistake;
receiving the utterance;
interpreting the utterance in accordance with the grammar; and
outputting feedback indicative of reader performance.

4. The non-transitory computer readable medium of claim 3, wherein the at least one reading learner mistake comprises a structural restart.

5. The non-transitory computer readable medium of claim 3, wherein the at least one reading learner mistake comprises a jump-ahead.

6. The non-transitory computer readable medium of claim 3, wherein the at least one reading learner mistake comprises at least one pronunciation mistake.

7. The non-transitory computer readable medium of claim 3, wherein the at least one reading learner mistake comprises a word insertion error or a word deletion error.

8. The non-transitory computer readable medium of claim 3, wherein the at least one reading learner mistake comprises a mistake in directionality.

9. The non-transitory computer readable medium of claim 3, wherein the at least one reading learner mistake comprises, for at least one of the one or more words, skipping the next word.

10. The non-transitory computer readable medium of claim 3, wherein the at least one reading learner mistake comprises, for at least one of the one or more words, repeating a current word.

11. The non-transitory computer readable medium of claim 3, wherein the at least one reading learner mistake comprises, for at least one of the one or more words, uttering an immediately preceding word.

12. The non-transitory computer readable medium of claim 3, wherein the at least one reading learner mistake comprises, for at least one of the one or more words, uttering a beginning of a current phrase of which the current word is a part.

13. The non-transitory computer readable medium of claim 3, wherein the at least one reading learner mistake comprises, for at least one of the one or more words that is a line-ending word, repeating a current line.

14. The non-transitory computer readable medium of claim 3, wherein the at least one reading learner mistake comprises, for at least one of the one or more words that is a line-ending word, uttering an immediately preceding line.

15. The non-transitory computer readable medium of claim 3, wherein the at least one reading learner grammar feature further comprises a reject grammar for at least one of the one or more words.

16. The non-transitory computer readable medium of claim 3, further comprising:
displaying the text to the reader prior to receiving the utterance.

17. The non-transitory computer readable medium of claim 16, wherein the displaying, the receiving of the utterance, and the interpreting are performed substantially simultaneously.

18. The non-transitory computer readable medium of claim 16, wherein the displaying comprises:
formatting the text for display.

19. The non-transitory computer readable medium of claim 18, wherein the text further comprises a formatting markup for guiding the formatting.

20. The non-transitory computer readable medium of claim 19, wherein the formatting comprises:
calculating a position of at least one text format feature in accordance with at least one characteristic of a device on which the text is to be displayed.

21. The non-transitory computer readable medium of claim 3, wherein the text further comprises metadata comprising semantic data.

22. The non-transitory computer readable medium of claim 3, wherein the feedback comprises at least partial results of the interpreting.

23. The non-transitory computer readable medium of claim 3, wherein the feedback comprises a score indicative of an accuracy of the utterance relative to the text.

24. The non-transitory computer readable medium of claim 23, wherein the score comprises at least one of: a number of words uttered by the reader in a given period of time, an amount of time taken by the reader to complete utterance of at least a portion of the text, a confidence score relating to a word uttered by the reader, a confidence score relating to a sentence uttered by the reader, a confidence score relating to a phrase uttered by the reader, or a percentage of words correctly uttered by the reader.

25. The non-transitory computer readable medium of claim 23, wherein the score is at least one of: a dialog act score, a duration score, a fluency score, a score related to a path taken through the grammar, or a pronunciation score.

26. The non-transitory computer readable medium of claim 3, wherein the feedback comprises at least one of: poorly uttered portions of the text, correctly uttered portions of the text, skipped portion of the text, or repeated portions of the text.

27. The non-transitory computer readable medium of claim 3, further comprising:
storing the feedback.

28. The non-transitory computer readable medium of claim 3, wherein the inserting comprises:
generating transitions representing a correct utterance of the text; and
generating transitions representing the at least one reading learner grammar feature.

29. The non-transitory computer readable medium of claim 28, wherein the transitions representing the correct utterance and the transitions representing the at least one reading learner feature are assigned probabilities.

30. The non-transitory computer readable medium of claim 28, wherein at least one word in at least one of the correct utterance and the transitions representing the at least one reading learner grammar feature is represented by a multi-word sub-grammar, the multi-word sub-grammar comprising:
the at least one word;
a reject grammar; and
a pause grammar.

31. The non-transitory computer readable medium of claim 3, wherein the text is received from local storage.

32. The non-transitory computer readable medium of claim 3, wherein the text is received from a remote computing device.

33. The non-transitory computer readable medium of claim 3, wherein the receiving text comprises:
performing optical character recognition on a piece of printed text.

* * * * *